United States Patent [19]

Olson, Jr. et al.

[11] Patent Number: 5,000,224

[45] Date of Patent: Mar. 19, 1991

[54] WATER SHUT-OFF VALVE ASSEMBLY

[75] Inventors: William C. Olson, Jr., Cave Creek, Ariz.; Gregory R. Johnson, Ham Lake, Minn.; Forrest E. Lovett, Menomonie, Wis.

[73] Assignee: Water Conservation, Inc., Scottsdale, Ariz.

[21] Appl. No.: 422,662

[22] Filed: Oct. 17, 1989

[51] Int. Cl.⁵ .............................................. F16K 31/02
[52] U.S. Cl. .............................. 137/624.12; 137/487.5; 137/495
[58] Field of Search ................ 137/624.11, 624.2, 495, 137/487.5, 459, 486; 251/30.02, 65

[56] References Cited

U.S. PATENT DOCUMENTS

| | | | |
|---|---|---|---|
| 4,105,186 | 8/1978 | Eby | 251/30.02 X |
| 4,235,414 | 11/1980 | Lis | 251/30.02 X |
| 4,249,565 | 2/1981 | Brust | 137/624.11 X |
| 4,518,955 | 5/1985 | Meyer | 340/605 |
| 4,522,229 | 6/1985 | Van de Moortele | 137/624.11 X |
| 4,589,435 | 5/1986 | Aldrich | 137/624.11 X |
| 4,883,025 | 11/1989 | Richeson | 251/65 |

Primary Examiner—Alan Cohan
Attorney, Agent, or Firm—Cahill, Sutton & Thomas

[57] ABSTRACT

A hydraulically actuated shut-off valve is controlled by a solenoid actuated control valve. A flow detection unit having a substantially vertical inlet and a substantially vertical flow passage has a substantially horizontal outlet connected to the horizontal inlet of the shut-off valve. A member movable by water flowing through the flow passage actuates a switch forming a part of the flow detection unit. A control box preferably mounted on the flow detection unit has a timer and a reset switch therein which are capable of sending electrical control signals to the solenoid actuator of the control valve. The timer senses the condition of the flow detection switch and upon sensing that the switch has been closed a predetermined period of time suggesting abnormal water flow, possibly due to a leak in the system, sends a signal to the solenoid to actuate the control valve to cause the shut-off valve to close, preventing further water flow. The reset switch sends a reverse signal to the solenoid to cause the shut-off valve to open.

4 Claims, 2 Drawing Sheets

WATER SHUT-OFF VALVE ASSEMBLY

TECHNICAL FIELD

This invention is concerned with apparatus for detecting abnormal water flow in a water supply system such as might be occasioned by a leak in the system or an outlet having been inadvertently left open. The invention is particularly concerned with providing relatively inexpensive, but reliable, apparatus suitable for use in an ordinary household residential unit.

BACKGROUND ART

It has previously been recognized that water flow through an ordinary household residential unit system is intermittent and that normal needs of the household are met by flows rarely exceeding periods of time measured in minutes. Water requirements for dish and clothes washing appliances are normally satisfied with interval water flows of two or three minutes and tub and shower bathing rarely requires a flow of water in excess of 10 minutes. Thus, when water flows continuously through the system for an extended period, say one or two hours, this is usually abnormal and is an indication that there is a leak in the system or someone or something has neglected to close an outlet valve. And, of course, such abnormal flow is highly undesirable because flooding of portions of the household can result in considerable damage to the structure and to its contents.

Prior inventors have devised water shut-off systems in which a valve was closed to terminate the flow of water into the household if there occurred a period of continuous flow of water exceeding a predetermined period of time. For example, Donald C. Aldrich in his U.S. Pat. No. 4,589,435, granted May 20, 1986 for "WATER SHUTOFF VALVE", discloses a valve for terminating flow of water in a residence in response to continuous flow of water therethrough for a predetermined period of time. The apparatus disclosed, however, employs fairly expensive components, such as a disk gate valve and an electronic sensor probe and circuit. The apparatus there disclosed exhibits the further disadvantage of allowing the water to again commence flowing if power is interrupted after shut off even though the leak in the system may not have been repaired.

U.S. Pat. No. 4,518,955, granted May 21, 1985 to Knut Meyer for "METHOD AND APPARATUS FOR DETECTING LEAKAGE IN A FLUID CONDUIT SYSTEM", discloses a very complex flow detection system utilizing a microcomputer to monitor the time flow takes place, the duration of the detected flow, the intensity of the detected flow, and information about what fluid drains of the conduit system are closed. This system simply is uneconomical for an ordinary household.

And Van de Moortele in his U.S. Pat. No. 4,522,229, granted June 11, 1985 for "SAFETY DEVICE FOR WATER-PIPES", discloses a completely hydromechanical safety device for terminating unwarranted water flow. Again, the device appears to be too complex and costly for household use.

There continues to be a need for an inexpensive, but reliable, system and apparatus for shutting off the flow of water in a residence in the event abnormal flow conditions are encountered.

SUMMARY OF THE INVENTION

This invention utilizes a normally open, hydraulically actuated, shut-off valve which can be controlled by a low voltage solenoid actuated control valve. The shut-off valve preferably has generally horizontal inlet and outlet flow passages. Connected to the inlet of the shut-off valve is the horizontal outlet of a flow detection unit having a generally vertical inlet and a generally vertical flow passage in which is positioned a vertically movable switch actuating member. A flow switch associated with the flow detection unit is connected to a timer which measures each period of time the flow switch is closed by virtue of water flowing through the flow detection unit to the shut-off valve. If the timer detects that the flow switch has been closed for a continuous predetermined period, the timer sends a signal to the solenoid actuated control valve to cause the shut-off valve to be closed. A reset switch is provided to send a reverse signal to the solenoid actuated control valve to cause the shut-off valve to be opened after the abnormal condition has been corrected.

For convenience, the several components of this invention can be incorporated into an assembly in which the timer and reset switch are carried in a control box mounted atop the flow detection unit adjacent the shutoff valve or at a remote location. Manual actuators for adjusting the period of time of response of the timer and for manipulating the reset switch can be displayed on a control panel forming a part of the control box.

BRIEF DESCRIPTION OF THE DRAWINGS

The invention and its various features are described in greater detail hereinafter by reference to the accompanying drawing, wherein.

BEST MODES FOR CARRYING OUT THE INVENTION

Figure 1:
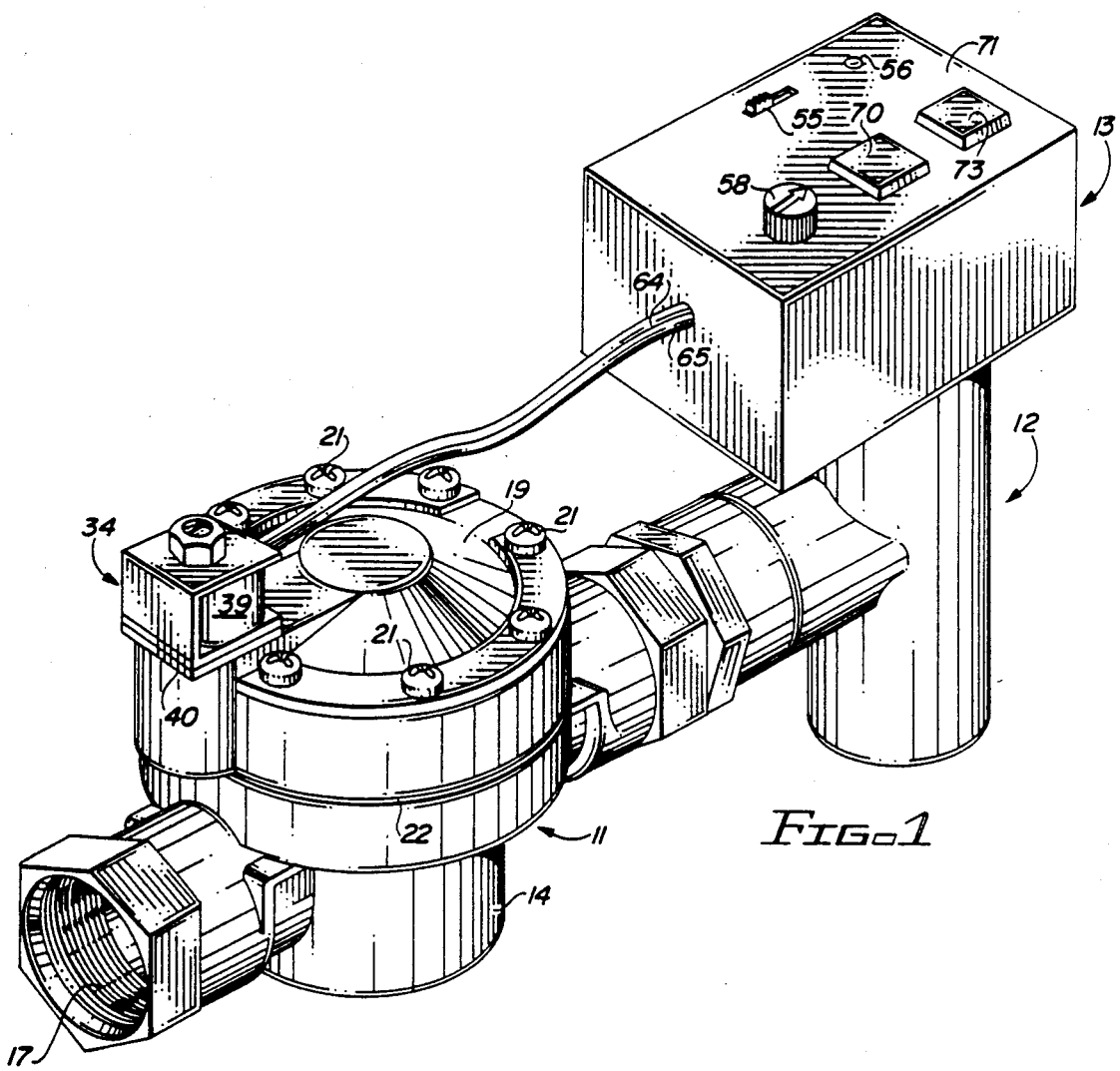
FIG. 1 is a three-quarter perspective view from above of a shut-off valve assembly constructed in accordance with this invention.
Figure 2:
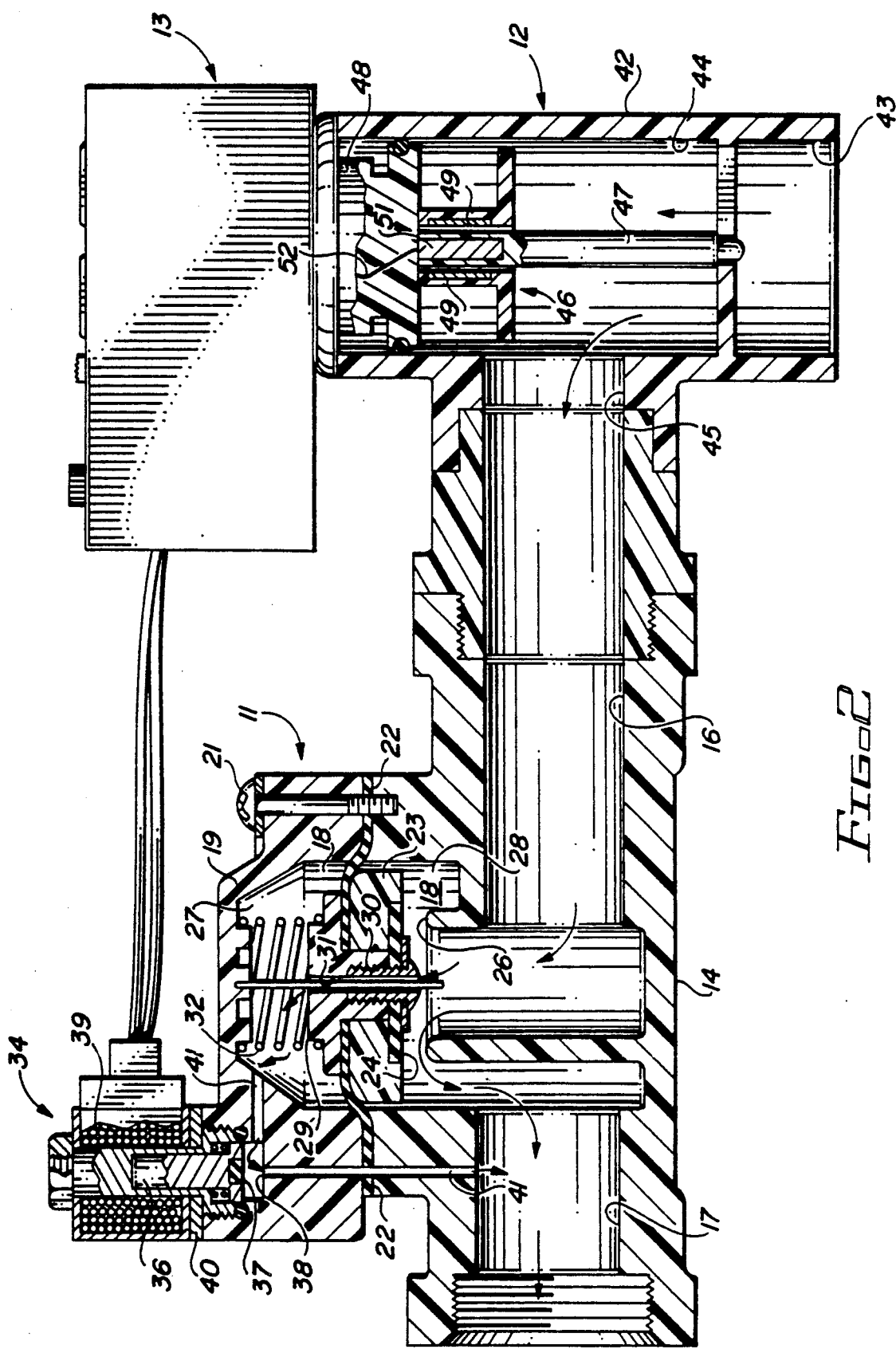
FIG. 2 is a partial vertical sectional view of the assembly shown in FIG. 1.

Referring particularly to FIGS. 1 and 2, the shutoff valve assembly of this invention in one of its preferred modes comprises a shut-off valve 11, a flow detection unit 12, and a control box 13.

Shut-off valve 11 is of a normally open, hydraulically actuated type, the construction of which is best illustrated in FIG. 2. Valve 11 is comprised of a body portion 14 having a horizontal inlet 16 and a horizontal outlet 17 communicating respectively with a valve chamber 18 which is completed and closed by a cover 19. The cover 19 of shut-off valve 11 is clamped in fluid tight engagement with the upper surface of valve body 14 by means of a series of screws 21 disposed about the periphery of the cover. Clamped between the cover 19 and the valve body 14 is the peripheral edge of a diaphragm 22. Diaphragm 22 is made of a thin sheet of elastic material, such as rubber, neoprene or like material. Diaphragm 22 divides valve chamber 18 into upper and lower sections, designated 27 and 28, respectively. Carried on a central region of diaphragm 22 is a closure member 23 having a resilient insert 24 adapted to seat against and seal valve seat 26 formed in the valve body 14 at the entrance to chamber 18.

Valve closure member 23 is mounted on the underside of diaphragm 22 by means of a grommet 29 and guide screw 30 both of which have a passageway 32 therethrough providing limited communication between the upper and lower sections 27 and 28 of valve chamber 18. A helical metal spring 31 disposed between grommet 29 and the upper wall of cover 19 biases closure member 23 downwardly toward valve seat 26. If desired, a pin 33 mounted in the upper wall of cover 19 and extending down through passageway 31 may be employed to guide the movement of closure member 23 and to assist in keeping passageway 31 clear of the buildup of salts which may be deposited from water passing through valve 11.

Opening and closing of valve 11 is controlled by a solenoid actuated control valve indicated generally by reference numeral 34 and mounted atop valve cover 19. Control valve 34 comprises an axially movable valve stem 36 having an elastic insert 37 adapted to seal against a seat 38 formed in valve cover 19. The control valve 34 is closed when insert 37 seals against the seat 38 and is opened when the insert is lifted clear of seat 38. Valve stem 36 is made of magnetically attractable material so that the stem functions as an armature within solenoid coil 39. A low voltage current flowing through coil 39 causes stem 36 to be raised to open the control valve or lowered to close the control valve, depending upon the direction of current flow through the coil.

Control valve 34 preferably is of a self-latching variety in which valve stem 36 is capable of being releasably restrained in the position, either raised or lowered, to which it is moved by the magnetic forces from solenoid coil 39. In the valve shown in FIGS. 1 and 2, this latching function is performed by a permanent magnet 40 surrounding valve stem 36. Magnet 40 is preferably formed of a sheet of vinyl plastic material heavily impregnated with a ceramic magnetic material. Magnet 40 functions to attract valve stem 36 and releasably hold it in the position in which it is driven by solenoid coil 39. The magnetic forces generated by coil 39 are sufficient to overcome the attraction of magnetic 40 to move stem 36.

Control valve 34 functions to control movement of closure member 22 of shut-off valve 11 by controlling the flow of fluid through a vent passage 41 providing a connection between the upper section 27 of valve chamber 18 and the valve outlet 17.

Valve 11 is caused to assume the open condition illustrated in FIG. 2 for the free flow of water from inlet 16 to outlet 17 by virtue of control valve 34 assuming the condition also shown in FIG. 2 in which its central valve stem insert 37 is held away from seat 38 to open vent passage 41. In this condition of the valve components any fluid, i.e., air or liquid, flowing into the upper section 27 from the lower section 28 of valve chamber 18 is permitted to bleed off or escape through passage 41. By virtue of the restricted flow between lower chamber section 28 and upper chamber section 27 afforded by passageway 31 a pressure differential is built up across diaphragm 22 causing the diaphragm to lift closure member 23 and its insert 24 away from seat 26. The shut-off valve 11 in this condition is open.

Valve 11 is caused to assume a closed condition under control of control valve 34 when the latter is energized to cause valve stem 36 to move downwardly so that its insert 37 seals against seat 38 closing off flow through vent passage 41. With vent passage 41 closed, fluid cannot escape from upper section 27 of chamber 18 and the fluid pressure acting on opposite faces of diaphragm 22 rapidly equalizes, allowing spring 32 to move closure member 23 and its insert 24 downwardly into sealing contact with shut-off valve seat 26 stopping the flow of liquid through valve 11. It can thus be seen that actuation of shut-off valve 11 is effected hydraulically with water pressure available from water supplied to the valve. This actuation can be controlled with a small, simple control valve 34 capable of being actuated by a low voltage and low wattage solenoid system consisting of coil 39 and valve stem 36. The electrical energy required for actuation of shut-off valve 11 is quite small and the electrical components for supplying energy are quite small and inexpensive.

It will also be appreciated that the principal components of shut-off valve 11, namely the body portion 14 and the cover 19, can be inexpensively molded of plastic materials.

In accordance with this invention, shut-off valve 11 is actuated in response to time periods of water flow therethrough. The invention thus requires means for detecting the flow of water through shut-off valve 11 and this function is fulfilled by the flow detection unit 12 which is connected to the inlet 16 of the shut-off valve. Unit 12 comprises a body portion 42 having formed therein a substantially vertical inlet 43, a substantially vertical flow passage 44, and a substantially horizontal outlet 45. Flow of water through unit 12 is sensed by a vertically movable flow sensing and switch actuating member 46 mounted for sliding movement on a guide pin 47 depending from a closure plug 48 at the upper end of the flow detection unit.

With water flowing through unit 12, the movable flow sensing member 46 moves upwardly to the position shown in FIG. 2. In this position, a magnet 49 embedded in the side surface of member 46 is brought into close proximity to a magnetically actuatable reed type flow switch 51 carried in closure plug 48 and causes that switch to close. With cessation of water flow through unit 12, member 46 descends by gravity separating magnet 49 from switch 51 and allowing the latter to open. The opening and closing of switch 51 provides an electrical signal representing the cessation and resumption, respectively, of water flow through flow detection unit 12 and shut-off valve 11. This signal is transmitted via leads 52 to the control circuitry located in control box 13 mounted atop unit 12.

Figure 3:
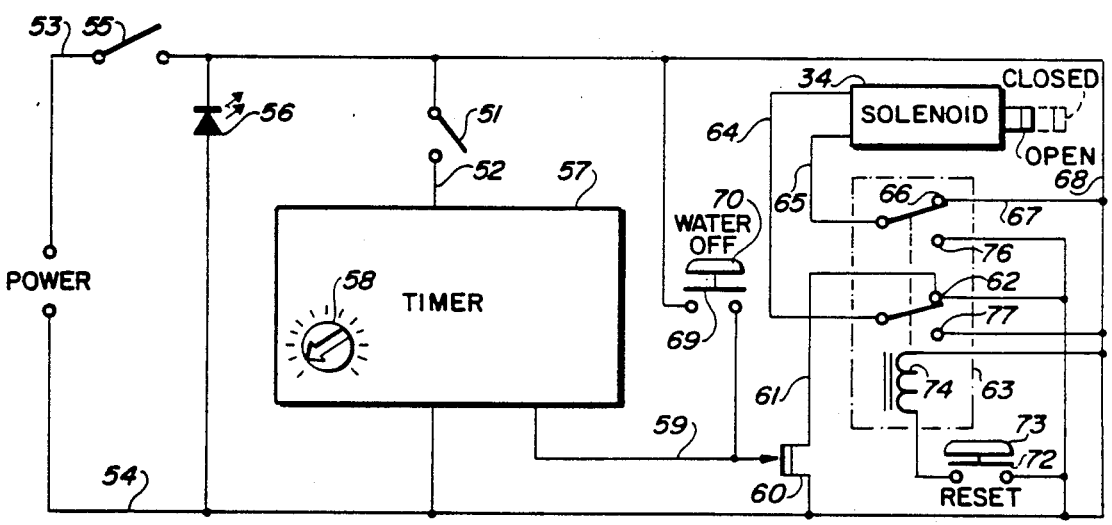
FIG. 3 is a schematic block diagram of electrical circuitry employed in the invention.

The control circuitry contained within control box 13 is shown schematically in FIG. 3 and performs two basic functions. The first function is the measurement of the length of each period of time water is flowing through unit 12, i.e., each period switch 51 is closed, and to signal solenoid valve 34 to cause shut-off valve 11 to close if any such period exceeds the predetermined time period for which the control circuit is set. The second function of the control circuitry is to provide for manual initiation of a reset signal to be sent to solenoid valve 34 to cause shut-off valve 11 to reopen.

The control circuitry includes a source of power (shown only schematically in FIG. 3) supplying electrical current to lines 53 and 54. The electrical energy is preferably in the form of direct current in a voltage range of from 12 to 24 volts. A main on/off line switch 55 is preferably provided in line 53 to permit the system to be temporarily rendered ineffective in situations where a very long continuous flow of water through the system is desired, such as, for example, to fill a swimming pool. A light emitting diode 54 may be connected across lines 53 and 54 after the line switch 55 to indicate whether the control circuitry has power.

The means for measuring the length of the periods of time flow switch 51 is closed is a timer 57 connected in series with switch 51 across lines 53 and 54. Timer 57 automatically resets itself to zero each time switch 51 is opened and commences its time measurement each time there is a closure of switch 51. Timer 57 includes means, such as knob 58, for adjusting the time period of water flow which is not to be exceeded. An adjustable range of from about 10 minutes to about four hours will ordinarily meet the needs of most households.

When timer 57 detects that flow switch 51 has been closed for the time period for which it has been set it emits a signal over lead 59 to the gate of a MOSFET transistor 60. Such a signal supplied to the transistor 60 causes the transistor to conduct establishing a circuit from power line 54, over lead 61, through a normally closed contact 62 in a relay 63, through a lead 64 to solenoid valve 36, thence back through lead 65 to another normally closed contact 66 and then through leads 67 and 68 to line 53. The coil 39 of solenoid valve 34 is thus energized to cause valve stem 36 to move to its closed position to initiate closure of shut-off valve 11 as explained previously.

Closure of shut-off valve 11 may also be manually initiated by means of a water off switch 69 which is manipulated by a push button 70 on the control panel 71 of control box 13. Switch 69 simply connects the gate of transistor 60 directly to line 53 causing solenoid control valve to be energized.

The means for resetting the shut-off valve assembly for normal operation includes a reset switch 72 in the control box 13. Reset switch 72 is manually actuated by a push button 73 on control panel 21. Closure of reset switch 72 establishes a circuit through the actuating coil 74 of relay 63 closing normally open contact 76 to connect solenoid valve lead 65 to line 54 and closing normally open contact 77 to connect solenoid valve lead 64 to line 53 via lead 68. The direction of signal current flow through leads 64 and 65 to solenoid valve 34 caused by the closure of reset switch 72 is the reverse of the signal current supplied to valve 34 by either the timer 57 or the water off switch 69. This reverse signal current causes solenoid coil 39 to generate magnetic force to move valve stem 36 upwardly opening vent passage 41 and causing shut-off valve 11 to open.

It is to be noted that all of the controls to the shut-off assembly, namely the timer adjustment knob 58, the on/off switch 55, and push buttons 70 and 73, together with the power indicator LED 56, are conveniently located on the control panel 71 of control box 13. If desired, however, the control panel 71 with the controls thereon can be placed at a location remote from the shut-off valve 11. Such an installation might be warranted where the shut-off valve 11 is required to be installed in a relatively inaccessible location, such as in a crawl space beneath the house.

From the foregoing, it should be apparent that this invention provides a relatively inexpensive, but reliable, solution to the problem of shutting off the flow of water through a system which has experienced abnormal flow conditions. By employing a hydraulically actuated shut-off valve 11, control of that valve can be effected by a simple, low voltage solenoid control valve 34 which, in turn can be energized from simple, low-voltage, low-cost control circuitry. The flow detection unit 12 employs a simple flow and gravity actuated switch actuating member also contributing to the low cost and reliability of the assembly.

What is claimed is:

1. A water shut-off valve assembly comprising a flow detection unit having switch means therein, said unit having a substantially upright flow inlet to a substantially vertical flow passage and a substantially horizontal outlet from said flow passage, said unit further comprising a member movable in said flow passage for actuating said switch means in response to flow of water through said flow passage, a hydraulically actuated valve having a substantially horizontal inlet and a substantially horizontal outlet, said valve having its inlet connected to the outlet of said flow detection unit, solenoid means carried by said valve for controlling operation of the valve, said solenoid means being movable between first and second positions to, respectively, cause said valve to open and close, timer means mounted on said flow detection unit, electrical connections between said timer means and said switch means and said solenoid means permitting said timer means to signal said solenoid means to cause said valve to shut off in response to the timer means sensing that water flow through said flow detection unit has exceeded a predetermined period of time, said solenoid means being movable from its first position to its second position in response to a signal from said timer means, reset means for signalling said solenoid means to move from its second position to its first position, and magnet means for releasably holding said solenoid means in its first and second positions.

2. A valve assembly as recited in claim 1, further characterized in that said reset means comprises a relay for reversing the signal current to said solenoid.

3. In a water shut-off valve assembly, the combination of a normally open, hydraulically actuated, shut-off valve, a control valve movable between open and closed positions for respectively causing opening and closing of said shut-off valve, a solenoid for actuating said control valve, flow detection means for detecting the flow of water to and through said shut-off valve, a flow switch actuated by said flow detection means, said flow detection means being adapted to close said flow switch upon detecting a flow of water therethrough, timer means connected to said flow switch and adapted to measure each period of time said flow switch is in its closed position, a source of electrical energy, said timer means being connected to said source of electrical energy and to said solenoid and being adapted to send an electrical signal to said solenoid to move said control valve to its closed position to cause closing of said shut-off valve when said timer means has determined that said flow switch has been closed a predetermined period of time, a reset switch connected to said source of electrical energy and to said solenoid and adapted to send an electrical signal to said solenoid to move said control valve to its open position to cause opening of said shut-off valve, and relay means associated with said reset switch for causing the electrical signal supplied to said solenoid from said reset switch to be the reverse of the electrical signal supplied to said solenoid from said timer means.

4. The combination recited in claim 3, further comprising magnetic means for releasably retaining said control valve in its opened and closed positions.

* * * * *